April 5, 1960     L. T. DAIGLE     2,931,315
ADJUSTABLE DIP CONVEYOR SYSTEM
Filed Oct. 29, 1958     2 Sheets-Sheet 1
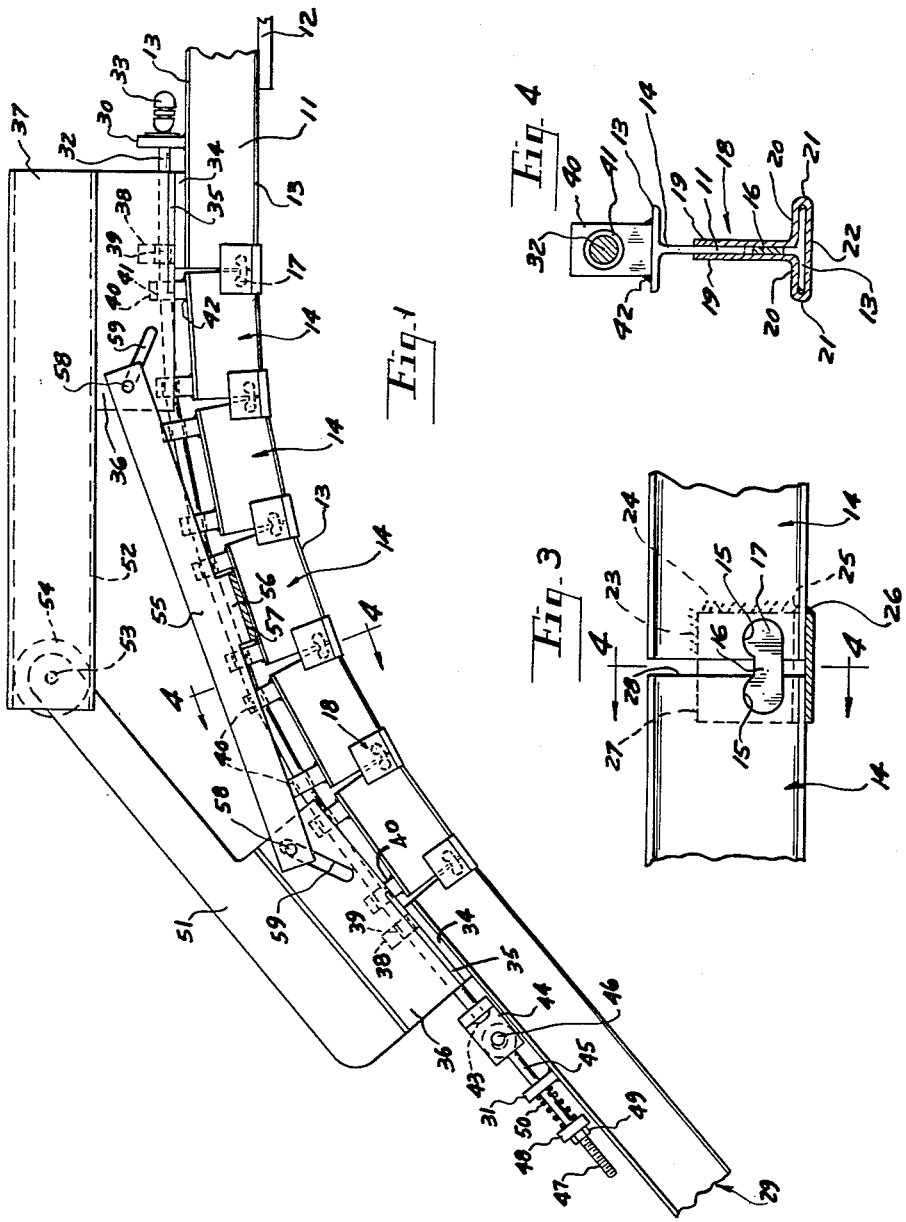
INVENTOR.
LEO T. DAIGLE
BY
*Robert Q. Sloman*
ATTORNEY

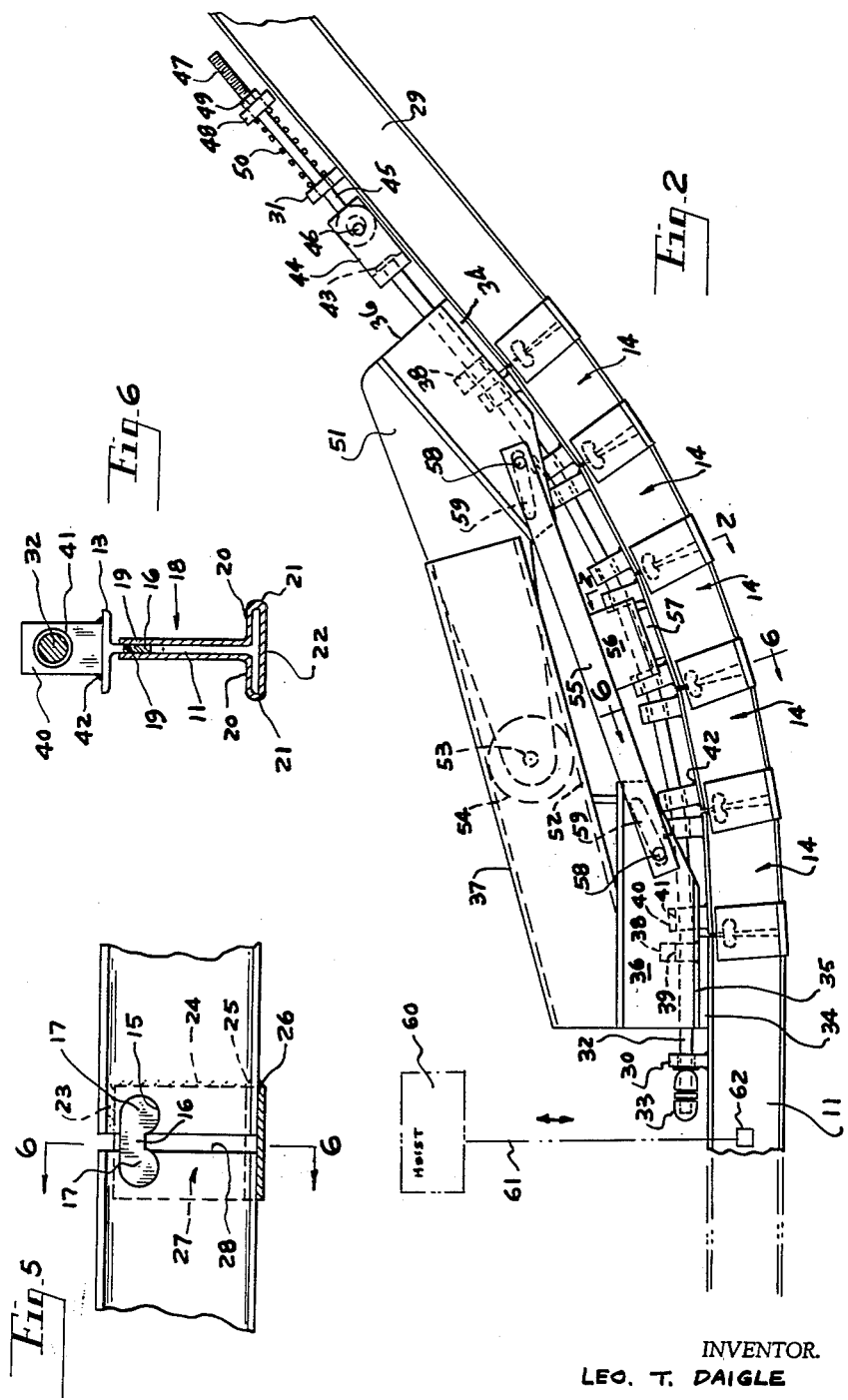

United States Patent Office 2,931,315
Patented Apr. 5, 1960

2,931,315
ADJUSTABLE DIP CONVEYOR SYSTEM

Leo T. Daigle, Detroit, Mich., assignor to Dearborn Fabricating & Engineering Company, Detroit, Mich., a corporation of Michigan Application October 29, 1958, Serial No. 770,329

13 Claims. (Cl. 104—111)

This invention relates to an adjustable dip conveyor system.

It is an object of this invention to provide a flexible type of trolley conveyor support adapted to movably support the rollers of conventional trolley conveyors, and wherein the vertical height of portions of the conveyor may be adjusted at will and still provide a smooth conveyor trackway.

Heretofore very often, the delivery end of a conveyor would be more efficient if it could be easily elevated or lowered for loading or unloading purposes.

Accordingly, it is an object of the present invention to provide an adjustable dip conveyor system which includes horizontally disposed end support I-beams, an inclined intermediate support I-beam, and series of relatively short angularly related I-beam segments arranged end to end in an arc with means pivotally interconnecting adjacent ends of the segments and the outer ends of end segments with corresponding ends of the support I-beams and intermediate support I-beam.

It is a further object to thus provide an I-beam conveyor mounting portions of whose elevations may be changed without interrupting the trackway over which is supportably moved a series of roller mounted trolley conveyors.

It is a further object to interpose between the respective I-beam segments hollow inverted T-shaped channels to bridge any gap between said segments or between a segment and an I-beam support.

These and other objects will be seen from the specification and claims in conjunction with the appended drawings in which:

Fig. 1 is fragmentary side elevational view of an upper portion of the present dip conveyor system.

Fig. 2 is a similar view of the lower extension thereof.

Fig. 3 is a partly sectioned fragmentary side elevational view on an enlarged scale, illustrating a pair of interconnected I-beam segments.

Fig. 4 is a fragmentary section taken on line 4—4 of Fig. 3, also corresponding to line 4—4 of Fig. 1, on an increased scale.

Fig. 5 is a fragmentary partly sectioned elevational view on an enlarged scale illustrating a pair of I-beam segments from the downwardly curved series of segments shown in Fig. 2.

Fig. 6 is a section taken on line 6—6 of Fig. 5, being also taken on an enlarged scale with respect to lines 6—6 of Fig. 2.

It will be understood that the above drawings illustrate merely a preferred embodiment of the invention and that other embodiments are contemplated within the scope of the claims hereafter set forth.

The present adjustable dip conveyor system is shown in side elevation with the lower portion illustrated in Fig. 2 and with its upper portion fragmentarily illustrated in Fig. 1 as an extension thereof.

For further purpose of illustration, the present adjustable dip conveyor system includes a pair of vertically and longitudinally spaced end support I-beams 11, representing the spaced top and bottom portions of a segment of the present conveyor system provided with suitable support means 12. An inclined intermediate support I-beam 29 is longitudinally spaced between I-beams 11.

As shown in Fig. 1, a first series of relatively short I-beam segments 14 are arranged in end to end relation defining an upwardly curved arc between upper end support I-beam 11 and the upper end of the intermediate support I-beam 29. These segments are pivotally interconnected as hereafter described.

A second series of relatively short I-beam segments 14 are arranged in end to end relation defining a downwardly curved arc Fig. 2, between the lower end support I-beam 11 and the adjacent end of intermediate I-beam 29. Portions of beam 29 are shown in Figs. 1 and 2.

Here also suitable means are employed for pivotally connecting the respective parts to provide a continuous conveyor trackway from which trolley type conveyors may be suspended and movably mounted.

Referring to Figs. 3 and 4, the segments 14 corresponding to Fig. 1 have formed through their adjacent lower end portions transverse undercut recesses 15 adapted to swivelly receive the similarly shaped ends 17 of the dog-bone type connectors 16 thereby providing a pivotal connection between adjacent ends of segments 14.

A similar connection is employed between the end of the outer I-beam segment and the adjacent end of support I-beam 11.

A series of hollow inverted T-shaped channels 18 are partly projected respectively over the lower one ends of segments 14 as well as the corresponding end of support 11 and are fixedly secured thereto by the welds 23, 24, 25 and 26.

Each of the T-shaped channels includes the spaced upright webs 19 terminating at their lower ends in outturned flanges 20, downturned edges 21 and bottom flange 22 so as to be snugly projected over end portions of the respective segments and support 11.

The forward open ends 27 of channels 18 project longitudinally so as to cooperatively and loosely receive the corresponding other ends 28 of adjacent segments 14, thereby bridging adjacent segments as shown in Fig. 1 and also bridging the adjacent segment and the upper end of intermediate support I-beam 29.

The flanges 20 of channel 18 cooperate with the lower flanges 13 of said segments and supports 11 and 29 to provide a continuous and arcuate trackway between I-beam support 11 and intermediate I-beam support 29. Segments 14 and I-beam supports 11 and 29 are of the same cross sectional shape and size including the upright web and the top and bottom flanges 13. Accordingly there is provided a continuous trolley conveyor support whose shape or curvature may be changed as desired.

Welds 25, Fig. 3, also provide for a smooth but slight incline for guiding the wheels of trolley conveyors up and over the particular T-shaped channel as it moves over the length of the conveyor trackway.

As shown in the drawings, the side walls 19 of channel 18 cooperatively overlie connectors 16 and serve the further function of maintaining an assembled relation of said connectors within the corresponding undercut recesses 15 and to prevent accidental disassembly.

Upright apertured guide 30 is secured by welding upon the end portion of support beam 11, and a corresponding apertured guide 31 is secured upon and projects normally of the upper end portion of intermediate support beam 29. A suitable steel cable 32 projects through guide 30 and is anchored thereto at 33.

Plate 34 on support 11 mounts flange 35 of upright support 36 for guide channel 37 which projects longitudinally of the end of support 11 towards intermediate support 29. An additional apertured guide 38, having a suitable internal bushing 39 is mounted and secured upon plate 34 of support 11 to cooperatively receive cable 32.

Additional apertured guides 40 with similar bushings 41 project normally from the upper opposite ends of segments 14 and are secured thereto by welds 42. Cable 32 is loosely threaded through the bushings of each of the segment guides 40, and as shown in Fig. 1 is adjustably secured in tension to the upper end portion of intermediate support I-beam 29. Bifurcated yoke 44 receives and secures at 43 the end of cable 32.

Eye-bolt 45 is positioned within said yoke, and connected thereto by pin 46. Said eye-bolt extends through guide 31 and has a threaded shank 47 receiving washer 48 and securing nut 49, there being a suitable compression spring interposed between washer 48 and guide 31.

By adjusting nut 49, the tension within cable 32 may be regulated for cooperating and supporting relation to the respective I-beam segments 14.

A similar plate 34 is secured upon beam 29 and mounts flange 35 of support 36 which carries the longitudinally extending arm 51 which projects from the upper end of support 29 and at its free end extends into guide channel 37. Suitable roller means 54 are journaled at 53 upon arm 51 and are movably supported within guide channel 37, with arm 51 projected through elongated slot 52 in the undersurface of said guide channel.

A stabilizer assembly is furthermore provided which consists of elongated stabilizer bar 55 which overlies the I-beam segments 14 and has a central depending arm 56 secured at 57 to an intermediate I-beam segment. The opposite ends of bar 55 are loosely connected by pins 58 to the respective supports 36, said pins extending loosely through inclined slots 59 formed through said supports.

The above description, as directed to the upper portion of the adjustable dip conveyor system, Fig. 1, similarly applies to the lower portion thereof shown in Fig. 2, wherein like numbering of parts is employed for convenience. As the upper series of segments 14 in Fig. 1 define an upwardly curved arc, the pivotal connection is adjacent their lower ends.

On the other hand, in Fig. 2, the respective pivotally connected segments 14 define a downwardly curved arc. Accordingly the connectors 16 are arranged toward the upper ends of the respective segments and I-beam supports. In both cases, the respective guide channels 18 serve the purpose of bridging any gap between the angularly related bottom flanges of the I-beam segments or adjacent I-beam support.

Accordingly, the I-beam segments 14 of Fig. 1 may be regarded as a first series of segments and the I-beam segments in Fig. 2 may be regarded as a second series of such segments.

The stabilizer assembly of Fig. 2 is the same as the stabilizer assembly of Fig. 1 with similar parts being similarly numbered. Here also in Fig. 2, guide channel 37 is joined to the lower I-beam support 11 and extends longitudinally toward a corresponding downwardly inclined guide arm 51, carrying roller means 54 for cooperation with channel 37 in the same manner as above described with respect to Fig. 1.

To complete the description of the present adjustable dip conveyor system, suitable means are employed for raising or lowering portions thereof. For illustration, as shown in Fig. 2, a suitable diagrammatically indicated hoist 60 or other lifting means, which may be hydraulic, electric or mechanical, is suspended over an I-beam, such as lower beam 11. A suitable lifting means 61 in the form of a cable depends from hoist 60 and is secured at 62 to a portion of I-beam support 11, by which said support may be raised or lowered as desired within the limits of the pivotal connections between segments 14.

In view of the pivotally interconnected I-beam segment structure above described, the stabilizer assemblies and the tension cables, vertical adjustment of one of the I-beam supports 11 will not effect the continuity of the I-beam support or any trolley conveyors which may be movably suspended therefrom.

One illustration of the use of the present adjustable dip conveyor system would be, for example, the loading of crates into a truck or other carrier wherein a first set of crates might be set upon the floor thereof and thereafter the second set arranged thereabove, etc. Many other uses may be employed for the present adjustable dip conveyor system.

Having described my invention, reference should now be had to the following claims.

I claim:

1. In an adjustable dip conveyor system, a horizontally disposed end support I-beam, a downwardly inclined intermediate support I-beam longitudinally spaced therefrom, a series of relatively short angularly related I-beam segments arranged end to end in an arc, means pivotally interconnecting adjacent ends of said segments and connecting the outer ends of the end segments with said end and intermediate support I-beams respectively, and a series of hollow inverted T-shaped channels at their one ends partly projected over the one ends of said segments and end support I-beam and secured thereto respectively, the other ends of said channels projecting longitudinally cooperatively and loosely receiving the corresponding other ends of said segments and one end of said intermediate support I-beam respectively, bridging adjacent segments and an adjacent segment and support I-beam respectively.

2. The adjustable dip conveyor system of claim 1, the flanges of said channels cooperating with the lower flanges of said segments and I-beam supports providing a continuous arcuate trackway between said I-beam supports.

3. The adjustable dip conveyor system of claim 1, said channels overlying and enclosing said pivotal means respectively.

4. In the adjustable dip conveyor system of claim 1, said pivotal means consisting of opposed undercut recesses formed through adjacent ends of the webs of said segments, and through adjacent ends of segments and supports, and similarly shaped dogbone connectors with their ends rotatably nested transversely through said recesses within the plane of said webs, said channels enclosing said connectors and maintaining their assembled relation.

5. In the conveyor system of claim 1, apertured guides projecting normally of the upper opposite ends of said segments and normally of end portions of said I-beam supports respectively, and a cable loosely and supportably projected through said guides, anchored at one end of said support I-beams and at its other end loosely and adjustably secured to the other support I-beam.

6. In the conveyor system of claim 1, apertured guides projecting normally of the upper opposite ends of said segments and normally of end portions of said I-beam supports respectively, and a cable loosely and supportably projected through said guides, anchored at one end to one of said support I-beams and at its other end loosely and adjustably secured to the other support I-beam, said latter securing including an eye-bolt movably projected through a guide on said other support, an adjustable stop on said eye-bolt, and a compression spring on said eye-bolt between said stop and said latter guide.

7. In the conveyor system of claim 1, a guide channel secured above one support I-beam and extending longitudinally thereof towards said other support I-beam, a guide arm secured above the other support I-beam and extending into said guide channel, roller means journaled on said arm movably mounted longitudinally thereof upon said guide channel, a stabilizer bar loosely and slidably mounted at its opposite ends upon said arm and guide channel respectively, and a support depending centrally from said stabilizer secured to an intermediate I-beam segment in suspending relation.

8. In the conveyor system of claim 1, apertured guides projecting normally of the upper opposite ends of said segments and normally of end portions and said I-beam support respectively, a cable loosely and supportably projected through said guides, anchored at one end to one of said support I-beams and at its other end loosely and adjustably secured to the other support I-beam, a guide channel secured above one support I-beam and extending longitudinally thereof towards other support I-beam, a guide arm secured above the other support I-beam and extending into said guide channel, roller means journaled on said arm movably mounted longitudinally thereof upon said guide channel, a stabilizer bar loosely and slidably mounted at its opposite ends upon said arm and guide channel respectively, and a support depending centrally from said stabilizer secured to an intermediate I-beam segment in suspending relation.

9. In the conveyor system of claim 1, the inclination of said intermediate support I-beam being changeable, the flanges of said channels cooperating with the lower flanges of said segments and I-beam supports providing a continuous arcuate trackway between said I-beam supports regardless of the degree of curvature defined by said segments within the limits of their pivotal connections.

10. In the conveyor system of claim 1, the securing of said channels to said segments and support I-beam including runout welds extending from the top of the channel flanges at their one ends to the adjacent segments and I-beam support flanges respectively.

11. In an adjustable dip conveyor system, a pair of vertically and longitudinally spaced end support I-beams, an inclined intermediate support I-beam longitudinally spaced between said I-beams, a first series of relatively short I-beam segments arranged end to end in an upwardly curved arc between the upper end support I-beam and the intermediate support I-beam, a second series of relatively short I-beam segments arranged end to end in a downwardly curved arc between the lower end support I-beam and said intermediate support I-beam, means pivotally interconnecting adjacent ends of said segments and connecting the outer ends of end segments in each series with said end support I-beams and intermediate support beam respectively, and a series of hollow inverted T-shaped channels at their one ends partly projected over the one ends of said segments and the one ends of said support I-beam and intermediate support I-beam and secured thereto respectively, the other ends of said channels projecting longitudinally cooperatively and loosely receiving corresponding other ends of said segments, intermediate support beam and lower support I-beam respectively.

12. In the conveyor system of claim 11, apertured guides projecting normally of the upper opposite ends of said segments and end portions of said I-beams, respectively, a cable for each series of I-beam segments loosely and supportably projected through said guides anchored at one end to one support I-beam and at its other end adjustably secured to said intermediate support I-beam.

13. In the conveyor system of claim 11, apertured guides projecting normally of the upper opposite ends of said segments and end portions of said I-beams respectively, a cable for each series of I-beam segments loosely and supportably projected through said guides anchored at one end to one support I-beam and at its other end adjustably secured to said intermediate support I-beam, stabilizer means adjustably interconnecting respectively the upper and lower ends of said intermediate support I-beam with the adjacent ends of said end support I-beams, a support depending centrally from each stabilizer means secured to an intermediate I-beam segment respectively in each series of I-beam segments, and means for vertically adjusting one of said end support I-beams.

References Cited in the file of this patent
UNITED STATES PATENTS

| | | |
|---|---|---|
| 1,875,535 | Whitney | Sept. 6, 1932 |
| 1,876,373 | Whitney | Sept. 6, 1932 |
| 2,371,907 | Moore et al. | Mar. 20, 1945 |
| 2,434,523 | Sheets | Jan. 13, 1948 |